(12) United States Patent
Sinkhorn et al.

(10) Patent No.: US 12,316,177 B2
(45) Date of Patent: May 27, 2025

(54) METHOD OF REPAIRING A HYDROGENERATOR

(71) Applicant: Electromechanical Engineering Associates, Inc., Monroeville, PA (US)

(72) Inventors: Jason Sinkhorn, Greensburg, PA (US); J. Barry Sargeant, DeLand, FL (US); Lauren Haley, Pittsburgh, PA (US); Thomas Schildkamp, Greensburg, PA (US)

(73) Assignee: Electromechanical Engineering Associates, Inc., Monroeville, PA (US)

( * ) Notice: Subject to any disclaimer, the term of this patent is extended or adjusted under 35 U.S.C. 154(b) by 0 days.

(21) Appl. No.: 18/537,203

(22) Filed: Dec. 12, 2023

(65) Prior Publication Data

US 2024/0136895 A1     Apr. 25, 2024

Related U.S. Application Data

(63) Continuation of application No. 16/974,278, filed on Dec. 14, 2020, now Pat. No. 11,870,310.

(51) Int. Cl.
*H02K 15/50* (2025.01)
*F03B 13/08* (2006.01)
(Continued)

(52) U.S. Cl.
CPC ........... *H02K 15/50* (2025.01); *F03B 13/083* (2013.01); *F16C 43/02* (2013.01); *G01N 29/043* (2013.01);
(Continued)

(58) Field of Classification Search
CPC ........... B23P 6/00; B23P 15/00; B23P 15/008; Y10T 29/49718; Y10T 29/49721; Y10T 29/4973; Y10T 29/49732; F03B 13/083; F05B 2230/80; F16C 43/02; F16C 17/04; F16C 2360/00; G01N 29/043;
(Continued)

(56) References Cited

U.S. PATENT DOCUMENTS 1,817,054 A     8/1931   Baudry
2,632,397 A     3/1953   Jandasek
(Continued)

FOREIGN PATENT DOCUMENTS

JP     54102501 A     8/1979
JP     60102829 A     6/1985

OTHER PUBLICATIONS

Sliney, "The Use of Silver in Self-Lubricating Coatings for Extreme Temperatures", Annual meeting of the Amer. Society of Lubrication Engineers (May 1985), 21 pages.

*Primary Examiner* — Sarang Afzali
*Assistant Examiner* — Darrell C Ford
(74) *Attorney, Agent, or Firm* — Eckert Seamans Cherin & Mellott LLC

(57) ABSTRACT

A method for repairing an electric generator having a rotor that rotates about a vertical axis, the rotor including a spider having a number of spider arms extending radially away from the axis, and a rim surrounding the spider. The weight of the rim is normally carried at least in part by rim support ledges of the spider arms. The method for repair includes supporting the rim from the top of the spider and thereby relieving some or all of the weight of the rim being supported by the rim support ledges.

15 Claims, 6 Drawing Sheets

(51) Int. Cl.
*F16C 43/02* (2006.01)
*G01N 29/04* (2006.01)
*H02K 1/30* (2006.01)
*H02K 7/18* (2006.01)
*F16C 17/04* (2006.01)

(52) U.S. Cl.
CPC ............ *H02K 1/30* (2013.01); *H02K 7/1823* (2013.01); *F05B 2230/80* (2013.01); *F16C 17/04* (2013.01); *F16C 2360/00* (2013.01); *G01N 2291/0289* (2013.01)

(58) Field of Classification Search
CPC .......... G01N 2291/0289; G01N 29/348; F01N 2291/2693; H02K 15/0006; H02K 1/30; H02K 7/1823; H02K 2213/06
See application file for complete search history.

(56) References Cited

U.S. PATENT DOCUMENTS

| | | |
|---|---|---|
| 2,994,793 A | 8/1961 | Sills |
| 3,046,426 A | 7/1962 | Gynt |
| 3,112,420 A | 11/1963 | Meyer |
| 3,470,404 A | 9/1969 | Agerman et al. |
| 3,529,193 A | 9/1970 | Lindstedt |
| 3,727,848 A | 4/1973 | Francis |
| 4,110,652 A | 8/1978 | McGahern |
| 4,160,180 A | 7/1979 | Vinogradov et al. |
| 4,182,966 A | 1/1980 | Mishra et al. |
| 4,283,648 A | 8/1981 | Spirk |
| 4,327,303 A * | 4/1982 | Jacobsen .................. H02K 1/30 310/423 |
| 4,619,029 A | 10/1986 | Newell et al. |
| 4,636,675 A | 1/1987 | Takahashi |
| 5,347,880 A * | 9/1994 | Kallenberger .......... F16H 55/12 74/447 |
| 6,204,589 B1 | 3/2001 | Cascio |
| 6,255,752 B1 | 7/2001 | Werner |
| 7,866,020 B2 | 1/2011 | Matsuyama et al. |
| 8,333,006 B2 | 12/2012 | Matsuyama et al. |
| 2004/0200057 A1 | 10/2004 | Maslov et al. |
| 2011/0278994 A1* | 11/2011 | Kuwahara ................ H02K 1/30 310/422 |
| 2013/0187486 A1 | 7/2013 | Lee et al. |
| 2015/0101180 A1 | 4/2015 | Neumann et al. |
| 2018/0375419 A1 | 12/2018 | Rebsdorf et al. |
| 2020/0331103 A1* | 10/2020 | Løvlund Toft .......... F16H 55/17 |

* cited by examiner

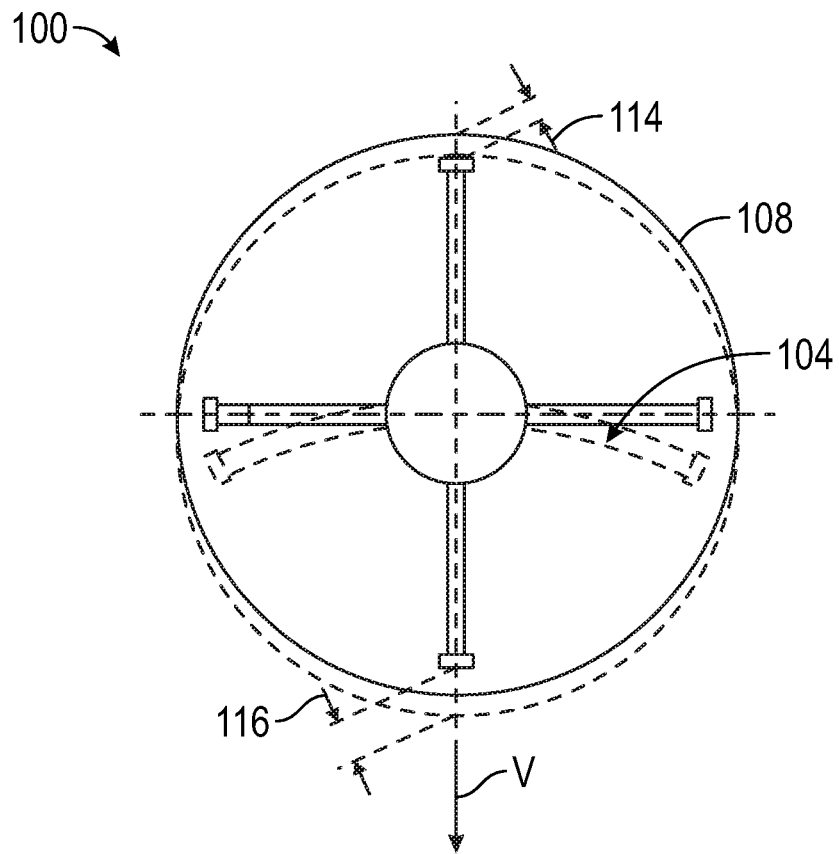
FIG. 4
(Prior Art)
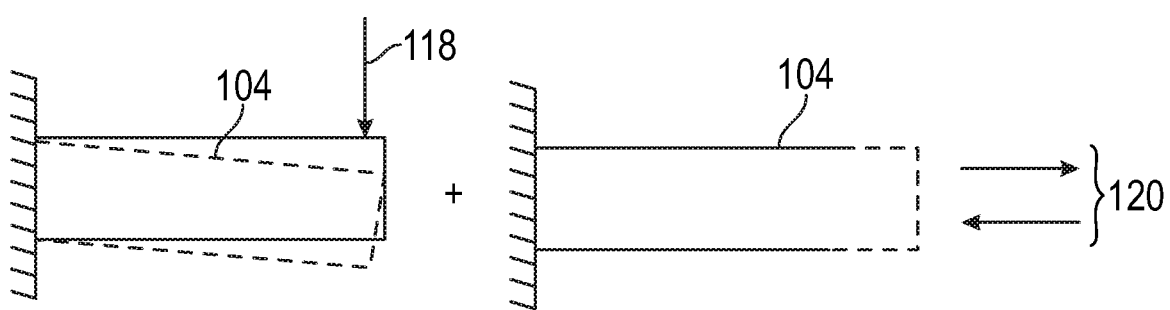
FIG. 5A
(Prior Art)
FIG. 5B
(Prior Art)

METHOD OF REPAIRING A HYDROGENERATOR

CROSS REFERENCE TO RELATED APPLICATIONS

This application is a continuation of U.S. patent application Ser. No. 16/974,278, filed Dec. 14, 2020, which is incorporated herein by reference in its entirety.

FIELD OF THE DISCLOSURE

The present disclosure relates to a method of repairing a hydrogenerator.

BACKGROUND OF THE DISCLOSURE

Background information is for informational purposes only and does not necessarily admit that subsequently mentioned information and publications are prior art.

Hydroelectric power comes from flowing water, for example, winter and spring runoff from mountain streams and clear lakes. Water, when it is falling by the force of gravity, can be used to turn turbines and generators that produce electricity.

At facilities called hydroelectric powerplants, hydropower is generated. Some powerplants are located on rivers, streams, and canals, but for a reliable water supply, dams are needed. Dams store water for later release for such purposes as irrigation, domestic and industrial use, and power generation. The reservoir acts much like a battery, storing water to be released as needed to generate power.

FIG. 1 illustrates a hydropower plant that includes an upper body of water 10 feeding a turbine 1 through a pressure line 20 via a shutoff element 30. The turbine 1 drives a generator 40 that generates electricity. The turbine 1 and the electric generator 40 together form a hydrogenerator (hydroelectric generator) 70.

As shown in FIG. 2, a dam creates a reservoir forming the upper body of water 10. The reservoir has a "head" or height from which water flows. A pipe (penstock) carries the water from the reservoir to the hydrogenerator 70. The hydrogenerator 70 shown in FIG. 2 is a vertical hydrogenerator designed around a vertically mounted shaft assembly. Attached to the upper portion of the shaft assembly is a rotor 100 (see FIG. 3A) of the generator 40. Attached to the lower end of the shaft is the turbine 1. The turbine 1 has turbine blades driven by the fast-moving water from the penstock, something like a pinwheel in the wind. The turbine 1 drives the rotor 100 within a stator of the electric generator 70 to generate electricity.

FIG. 3A shows a rotor 100 of a typical electric generator 40, and FIG. 3B shows a cross-section of the circled portion of the rotor 100 in FIG. 3A. The rotor 100 includes a shaft 102 and a spider 103 attached to the shaft 102. The spider 103 supports a rim 108 surrounding the shaft 102. The rim 108 carries a number of poles 110 spaced along the outer circumference of the rim 108. When the poles 110 pass by poles in the stator during rotation of the rotor 100, the electric generator 70 generates electricity.

The illustrated spider 103 is a welded steel structure having six spider arms 104 with vertical posts 105 at their ends that support the rim 108. The rim 108 is a ring of laminated steel segments held together by solid steel end plates 109 at the top and bottom, and clamped together by bolts 130 (see FIG. 6) passing through the end plates and laminations. The rotor poles 110 in turn are supported by the rim 108 both radially, usually by dovetails, and axially by the rim 108.

The weight of the rotor 100 and the rim 108 are supported on the vertical posts 105 of the spider arms 104. Each vertical post 105 is provided with a rim support ledge 106 machined in the base of the vertical post. FIG. 3C shows a close-up view of a rim support ledge 106 machined in the base of the vertical post 105. In general, the rim 108 is supported on the rim support ledges 106, and is mounted on the spider arms 104 by a friction fit.

A common problem that occurs in the operation of the electric generator 40 is that wear occurs at the rim support ledge 106 generally due to friction between the rim 108 and the rim support ledge 106. Because of different operational forces and other factors, the rim 108 may move with respect to the rim support ledge 106, which can ultimately lead to damage, such as the fracture 112 of the rim support ledge 106 illustrated in FIG. 3C.

Examples of operational forces that may cause the rim 108 to move with respect to one or more of the rim support ledges 106 include high frequency forces that may occur once or twice with each revolution of the rotor 100: eccentricity (out of roundness) of the rotor 100; and unbalanced magnetic forces that can distort the rim 108.

An unbalanced magnetic pole vector V on the rotor 100 is shown in FIG. 4. The clearance 114 at the top of FIG. 4 is shown as the clearance with the rim 108 concentric. The eccentricity 116 at the bottom of FIG. 4 is shown as clearance with the rim 108 eccentric. The magnetic forces distort the rim 108 during operation whereby, because of the rim's construction in layers, fretting or other wear occurs which ultimately leads to the failure of some part of the rotor structure which then must be repaired. The lateral flexibility of the spider arms 104 plus the loss of frictional interference between the rim 108 and the spider arms 104 permits the rim 108 to slide on the ledges 106 at each start, and also once per revolution, when exposed to an unbalanced magnetic pole. It is very difficult if not impossible to build a hydrogenerator which does not have an unbalance magnetic pole. Even the slightest unbalance will cause the components of the rotor to move with respect to one another and cause fretting if not other wear on the rotor.

Examples of operational forces that may cause the rim 108 to move with respect to one or more of the rim support ledges 106 include low cycle forces that occur with start/stop of the hydrogenerator 70 or arise from transient operating conditions: radial expansion of the rim 108 caused by rotation of the rim 108; differential radial expansion of the rim 108 caused by the rim 108 heating more than the spider 103 during operation; stopping and cooling of the rim 108 when the hydrogenerator 70 is shut down; and overspeed/runaway conditions, out-of-phase synchronizations, short circuits, and transient torque spikes.

FIG. 5A shows the force 118 of the dead weight of the rim 108 and the poles 110 pulling down on the spider arms 104. FIG. 5B shows the traction (friction) force 120 from sliding, which forces combine to cause wear during operation. The dead weight of the rim 108 and the poles 110 will act upon components of the hydroelectric generator 70. At each start and stop of the hydroelectric generator 70 there will be a centrifugal force on the generator rim 108, thereby causing the components thereof to move with respect to one another. The movement of the components with respect to one another will cause or contribute in causing the fretting or other damage to the components of the rotor 100, which will accelerate damage and the appearance of cracks in the structure of the rotor 100.

In general, hydrogenerators often experience fatigue cracking of the rotor rim support ledges. The rim support ledges are where fatigue and wear caused by the relative movement of the rim can occur. The wear can produce cracking and eventually even a complete fracture or breaking off of a rim support ledge. Since the ledges provide support for the rim, breakage of these ledges could result in significant damage to the rotor as a whole and individual components thereof, as well as any adjacent portions of the hydrogenerator.

The most common approaches to repair damaged rim support ledges are to either remove and then replace or refurbish the rim, or to provide supplemental supports beneath the rim or in the rim vent duct. Replacement or refurbishment is undesirable as it is very expensive, time-consuming, and requires complete removal or lifting of the rim. Supplemental supports beneath the rim are not usually able to carry the full load of the rim and have poor resistance to fatigue. Supplemental supports in the rim vent duct have the problems of not being applicable to all machines, difficulty in achieving load sharing, and having an indeterminate lifespan.

Thus, there is a need to provide a cost-effective repair method for hydrogenerators to extend the life span of a rim and spider of a rotor upon damage to the rim support ledges.

SUMMARY OF THE DISCLOSURE

Disclosed is a cost-effective repair method for hydrogenerators that extends the life span of a rim and spider of a rotor upon damage to the rim support ledges.

According to one possible embodiment, the repair method involves the rim being supported from the top of the spider posts instead of on the rim support ledges at the bottom of the spider posts. In general, support structures are attached to the tops of the spider posts to support the rim from above and relieve the weight on the rim support ledges.

Embodiments of the support structures are thrust plates formed from steel having sufficient strength to support the rim while preserving ductility and toughness for fatigue resistance. The thrust plates can be affixed to the rim with sleeve bolts that thread to the rim clamping studs. The sleeve bolts can be tightened periodically to compensate for wear of the thrust plates or to compensate for wear of wear plates placed below the thrust plates.

The disclosed method for repair hangs the rim from the top of the spider posts. The disclosed method has a number of advantages:
1. It replaces the rim ledge with a considerably stronger piece of material that is still ductile and has excellent fatigue resistance;
2. The support structures have a greatly reduced stress concentration at the corner of the support as compared to the rim ledges;
3. The support structures control the friction between the rim support and the spider post; and
4. The support structures reset the "fatigue cycles" counter to zero with respect to support of the rim on the spider.

BRIEF DESCRIPTION OF THE DRAWINGS

FIG. 4 shows an unbalanced magnetic pole vector on a rotor;
FIG. 5A shows the dead weight of the rim and the poles of a rotor,
and FIG. 5B shows the traction (friction) force from sliding.

DETAILED DESCRIPTION

Figure 1:
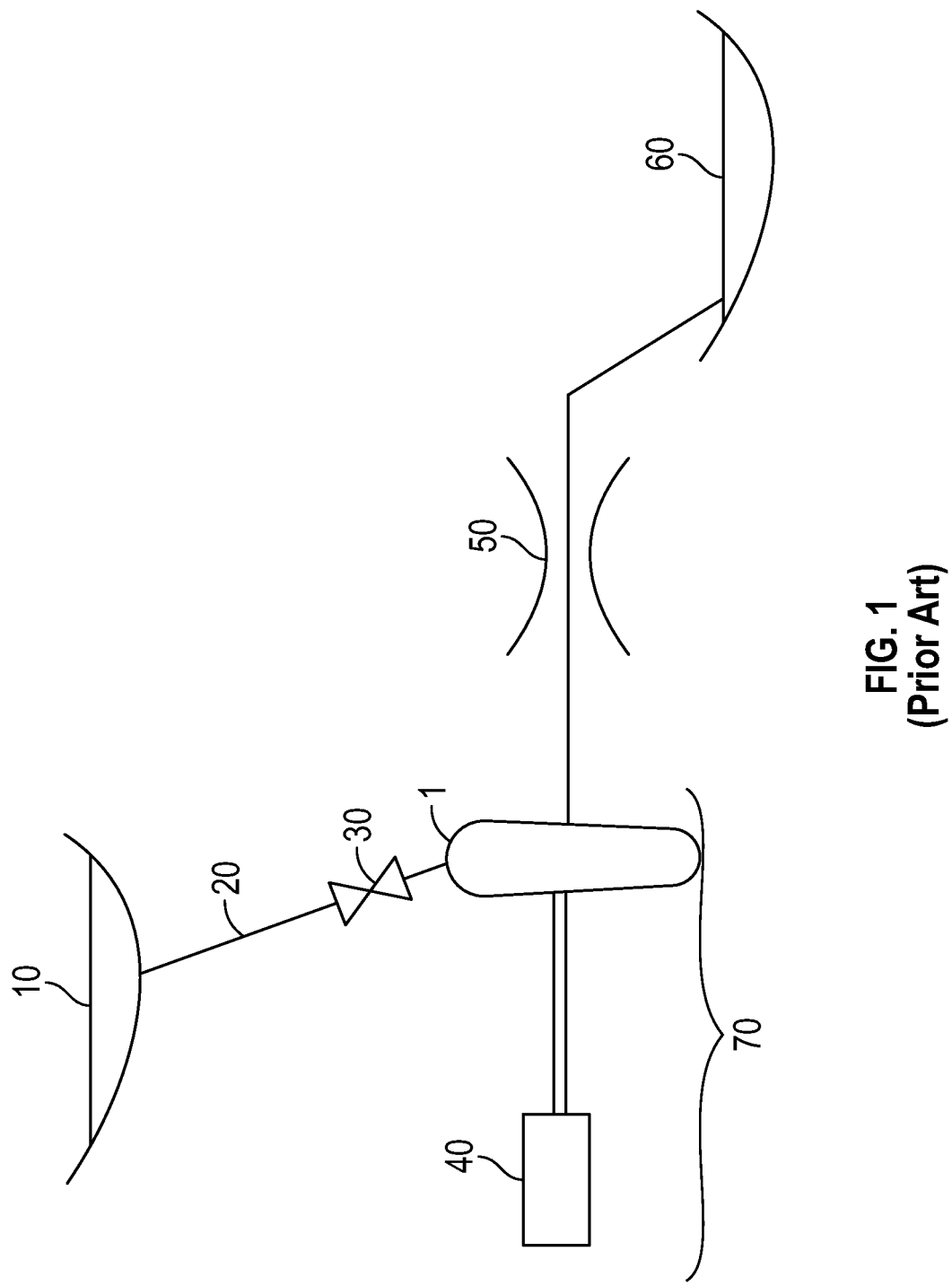
FIG. 1 shows a possible hydropower plant.
Figure 2:
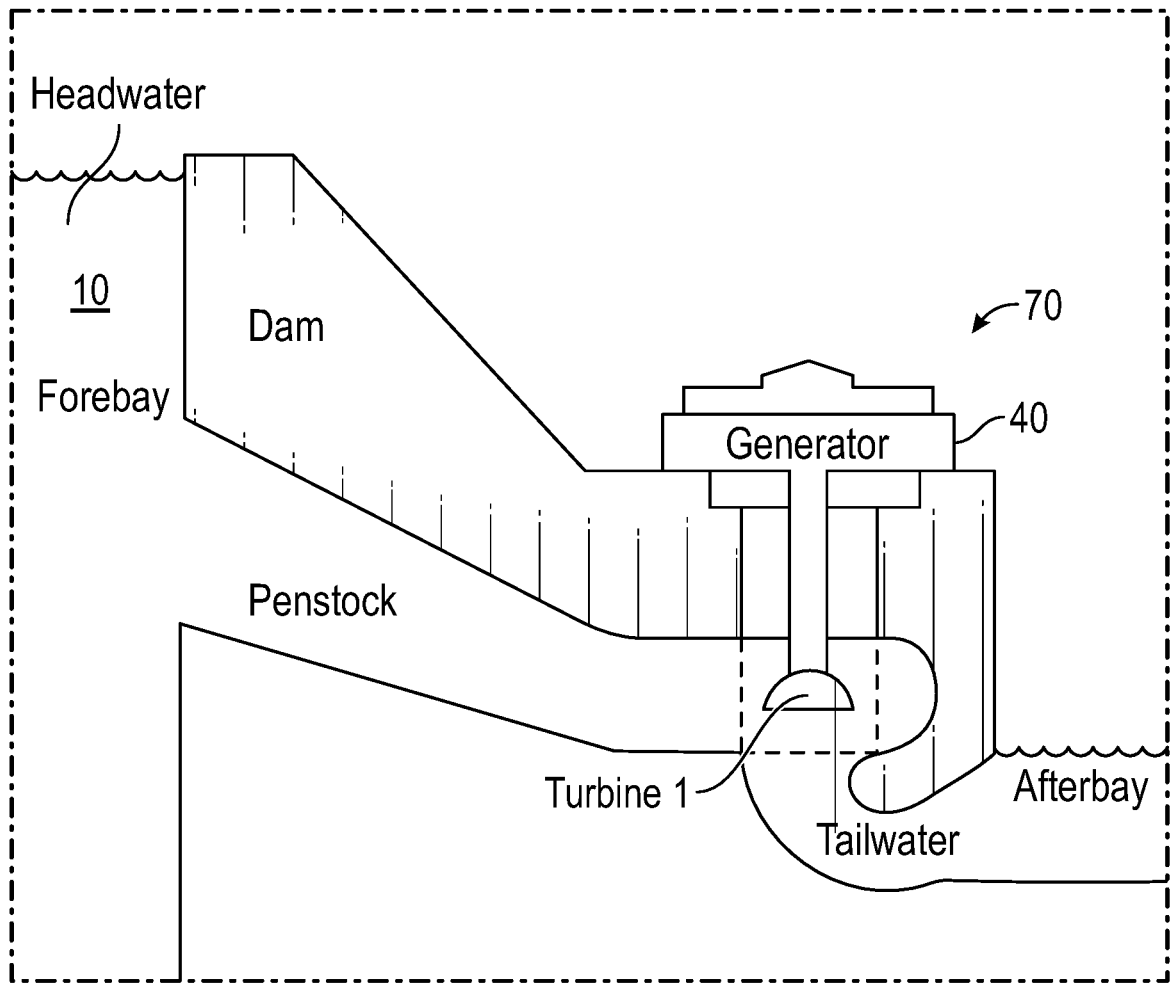
FIG. 2 is a diagram of how a hydropower plant works.
Figure 3A:
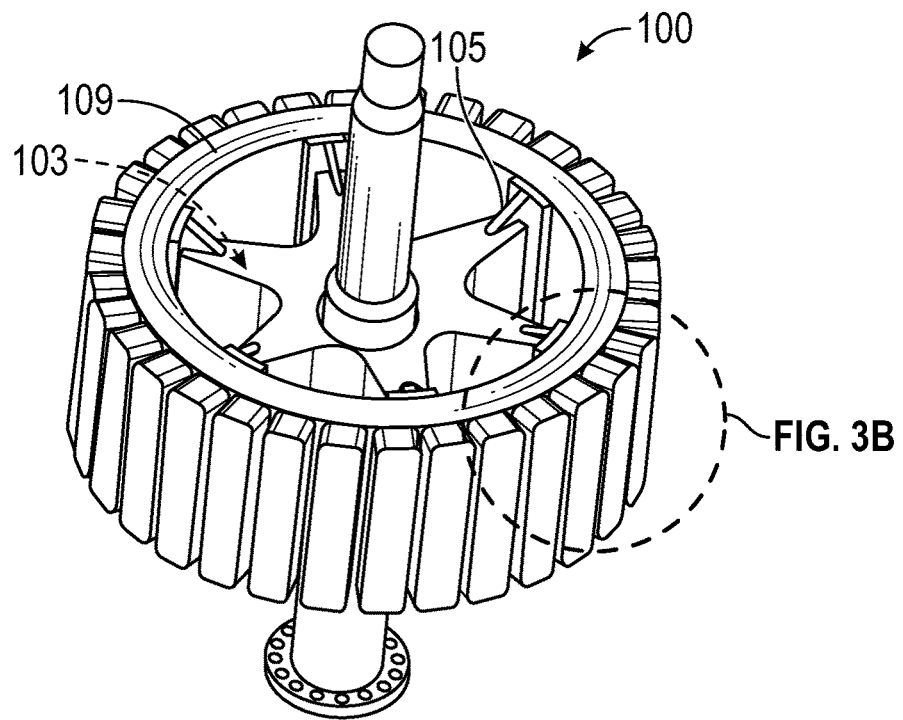
FIGS. 3A, 3B, and 3C show a typical geometry and failure location of a rotor.
Figure 3B:
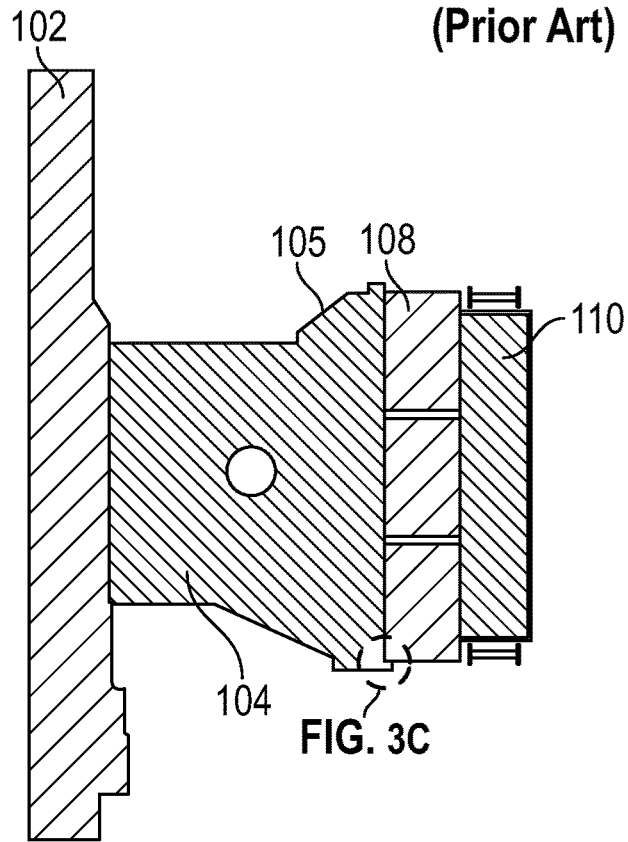
Figure 3C:
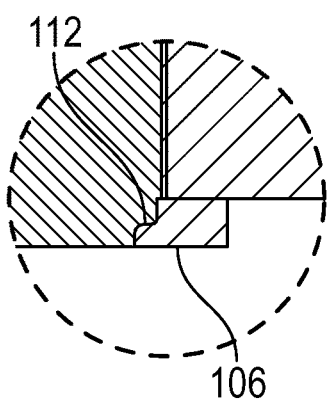
Figure 6:
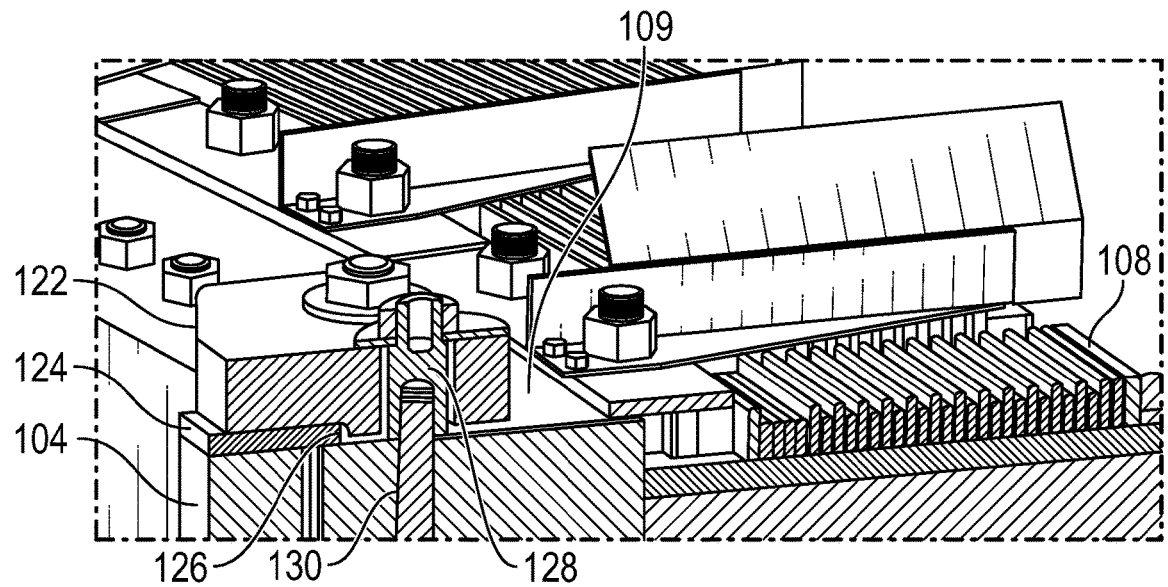
FIGS. 6 and 7 show an embodiment of a thrust plate assembly for a hydrogenerator in place on the rotor shown in FIG. 3.

FIG. 6 shows a thrust plate assembly having a thrust plate 122 used in an embodiment of the disclosed method for repairing the electric generator 40 shown in FIGS. 3A and 3C as having a fractured rim support ledge 106.

In general, in this embodiment a plurality of thrust plates 122 are located one at each of a corresponding spider arm 104. The thrust plates 122 support the rim 108 from above on the spider arms 104. In other words, instead of the weight of the rim 108 resting solely on the rim support ledges 106, which one or more rim support ledges 106 are cracked or completely broken off, the weight of the rim 108 is supported by the thrust plates 122, such that the rim 108 is, in a sense, hanging from the thrust plates 122. The thrust plate 122 is spaced apart from the rim 108 itself.

In the illustrated embodiment a wear plate or sacrificial plate 124 is located in a recessed or stepped or shoulder portion 126 of the thrust plate 122 between the thrust plate 122 and the spider arm 104. A portion of the wear plate 124 may or may not extend so as to be in contact with the top of the rim 108. The spacing of the thrust plate 122 a distance from the rim 108 prevents frictional contact between the thrust plate 122 and the rim 108, and thus prevents wear. Instead, the wear plate 124, which is lubricated with a solid lubricant, experiences friction and wear.

As the wear plate 124 wears down, a sleeve bolt 128 can be tightened periodically to tighten the connection of the thrust plate 122. In this manner, the life of the rotor 100 can be extended without extensive repairs or replacement.

The following discusses the installation, design, and function of the thrust plate 122 in greater detail. It should be noted that all numbers and materials specifically listed for different parts and components and measurements thereof are strictly in accordance with at least one possible embodiment and should not be understood as limiting the embodiments disclosed herein, as well as any reasonable variations or modifications thereof.

Figure 7:
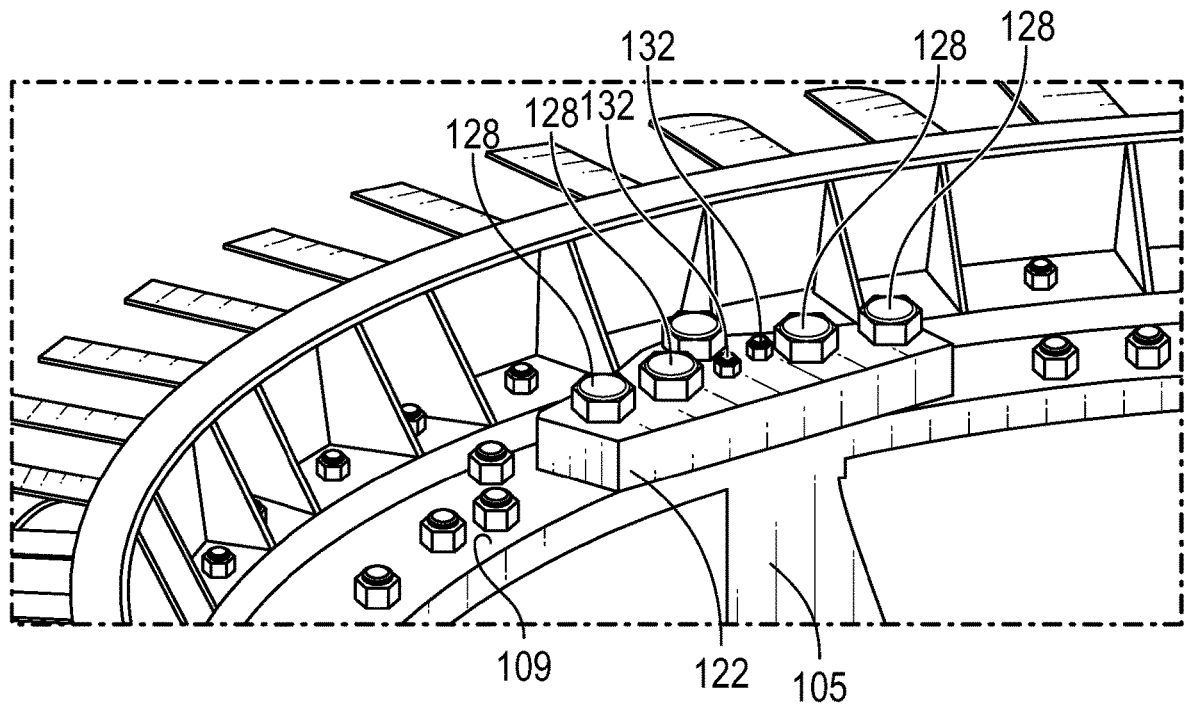
Figure 8:
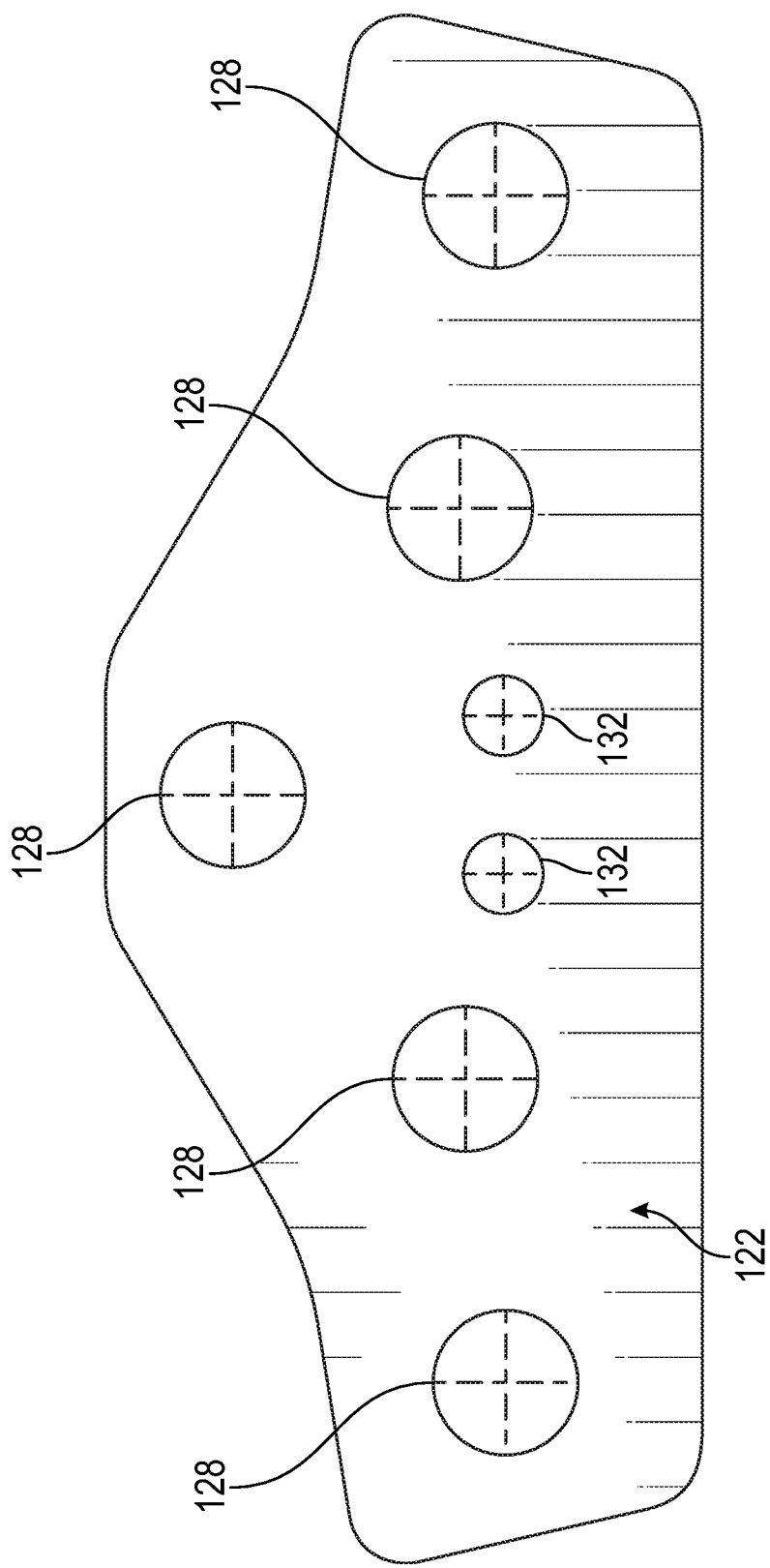
FIG. 8 is a top view of the thrust plate of the thrust plate assembly shown in FIG. 7.

FIG. 7 illustrates mounting of a thrust plate 122 on the rim 108 adjacent to a spider arm vertical post 105, and FIG. 8 illustrates the fasteners fastening the thrust plate 122 on the rim top plate 109. The thrust plates 122 can be 3" (three inch) thick machined plates manufactured from ASTM A829 SAE 4140 with a minimum yield strength of 70 ksi, and a UTS not less than 118 ksi and a 40% reduction in area. This provides strength while providing ductility and toughness for fatigue resistance. Each thrust plate 122 is affixed to the rim 108 with five sleeve bolts 128 that thread to the rim clamping studs 130 (see FIG. 6), and two 1.25" (one-and-one-quarter inch) alloy socket head cap screws 132.

The sleeve bolts 128 are modeled for stress analysis as though a 2.75" (two- and three-quarters inch) Hex bolt with a suitable length of unthreaded shank were cut off, bored and tapped with 1.75"-5 UNC inside threads. The minimum tensile area of this configuration is slightly greater than that of the original stud. The sleeve bolts 128 are made from commercial Grade 5 bolts, and thus will be at least as strong as the rim studs 130. The length below the heads will be 3" (three inches); then with the washers under the head, contact of the bottom of the shank with the rim top plate 109 will be avoided.

The two 1.25" (one-and-one-quarter inch) socket head cap screws 132 are used to resist localized bending due to the weight of the rim 108. The design specification calls for a maximum of ⅓rd (one-third) of the rim weight to be carried by an individual thrust plate 122. This is slightly over 33 tons for the illustrated rim, and though obviously could not be carried by all of the thrust plates 122, could conceivably be carried by some of them. The rim top plate 109 must be drilled and tapped for the Helicoil thread insert corresponding to this thread.

Stress analysis (including the use of finite element models) and both high-cycle fatigue analysis and low cycle fatigue analysis of the thrust plate, rim top plate in the vicinity of its attachment to the thrust plate, and the loading of the fasteners attaching the transfer plate to the top of the rim were conducted. Stresses in the thrust plate, rim top plate in the vicinity of the attachment, and the loading of the socket head cap screws were evaluated. Because the rim 108 now hangs from the rim's top end plate 109, stresses in the top end plate are impacted. Also impacted are rim compression and rim studs, which in addition to the clamping load now carry the weight of the rim in an area localized to the thrust plate installation.

Evaluation of the thrust plate, rim, rim top plate and attachment methods under very conservative loading assumptions show that the repair method applied to the rotor 100 will be suitable for at least a 5 year life, and very likely for a considerable period beyond this if necessary. The conditions necessarily used for evaluation were found to be conservative just as this report was being finalized. That is, it was found that the rotor rims were loose enough to be lifted off the spider arm support ledges. This more certainly fixes the spider post dead weight loading at 1x the rim weight as a steady load (up-thrusting is eliminated). It was therefore concluded that the thrust plate repair will be suitable for the service intended.

Further, in evaluating the application of the disclosed method for repair to a specific hydrogenerator, it may not be known if it is possible to lift the rim relative to the spider. This can result in a somewhat indeterminate loading situation. The rim would be leveled and the thrust plates would be assembled to a cold rim. At that point the transfer plates would be carrying little load. But as it is unclear how much load cracked ledges might bear (and clearly broken ledges would bear none), a complex load situation may be created. The loading scenario may be based on solid rim support ledges. In order to bound the possibilities of a lack of support from some of the ledges, the possible load on an arm may be increased (for example, doubled).

It may be that the rim could be lifted from the support ledges. This makes it possible to control the loading scenario so that the spider arms will carry only ⅙th (not ⅓rd) of the rim load each, as a steady load. With careful friction control, then, the stress ranges due to rim movement on the bearing surfaces may be lowered. As well, there will be no unloading of the rim weight as is posited in the low cycle fatigue scenario.

For some rotors, the spider is designed with uneven angular spacing of the rotor spider arms. Taken together, it appears that the intent was to make the rim as close to "elastically solid" as possible. That is to say that slipping between laminations, which would allow the rim to grow circumferentially leading to a loss of interference with the spider, is prevented (or attempted to be prevented) by high friction forces and close fitting of the clamping bolts to the holes in the laminations.

In evaluating application of the disclosed method for repair to a specific hydrogenerator, it may not be known if the hydrogenerator rim was designed to "float" duration operation. Hydro generators of similar construction have been designed with floating rims; however, rims utilizing an interference fit relative to the spider are more common. Regardless of the original design, it is accepted that the rim is now floating and likely has been for some time. That is, the rim outgrows the spider due to centrifugal forces and differential heating. This is a small amount of movement and ideally occurs only once per start/stop cycle. This movement creates an alternating "push-pull" on the rim support ledges that is imposed on the steady state stresses due to the dead weight of the rim and poles. Thus, a low cycle fatigue situation would likely exist even under ideal conditions just based on the design and construction, and the rim ledges should have been designed to withstand that scenario. Rim ledge cracking is ordinarily a high cycle fatigue problem caused by the normal imperfections of operation in combination with rim dead weight loading and the frictional forces on the rim ledge due to rim movement. These "normal imperfections" include such things as eccentricity of the rotor in the stator, unbalanced magnetic pull, and the elastic deformation of the rotor and stator. This causes the push-pull frictional forces noted above to increase in frequency from once or (a few times) per start-stop cycle to once or twice per revolution, a clearly different fatigue regime in which millions of cycles occur relatively quickly. As an example, suppose these machines were started and stopped once per day; then 365 cycles/year would occur. But if they were operated even 12 hours/day at 277 rpm, 457 million cycles would occur in 1 year.

It is impossible to avoid these forces to some degree in any hydro generator. Some manufacturers attempt to prevent the cracking by shrinking the rim onto the spider, so that the rim does not slide on the rim ledge. On these machines, without a specific preload target, it can only be stated that the combination of measures did not prevent the movement. It is also noted that, as these are frictional forces due to sliding, the forces on the rim ledge due to startup and shutdown are of the same magnitude as high cycle forces that cause smaller movements.

The following patents, patent applications, patent publications, and other documents, except of the exceptions indicated herein, are hereby incorporated by reference as if set forth in their entirety herein except for the exceptions indicated herein, as follows: "The Use of Silver in Self-Lubricating Coatings for Extreme Temperatures" by Harold E. Sliney, prepared for the Annual Meeting of the American Society of Lubrication Engineers, Las Vegas, Nev., May 6-9, 1985; U.S. Pat. No. 8,333,006, having the title "Method for removing a crack in an electromechanical rotor", issued on Dec. 18, 2012; U.S. Pat. No. 7,866,020, having the title "Method for repairing a crack in an electromechanical rotor, method for preventing crack growth in the same, electromechanical rotor and rotary electrical machine", issued on Jan. 11, 2011; U.S. Pat. No. 4,636,675, having the title "Rotor spider for rotary electric machine", issued on Jan. 13, 1987; U.S. Pat. No. 4,327,303, having the title "Rotor assembly for a dynamoelectric machine", issued on Apr. 27, 1982; U.S. Pat. No. 4,283,648, having the title "Synchronous electric machine with salient poles in the rotor", issued on Aug. 11, 1981; U.S. Pat. No. 4,182,966, having the title "Ventilation system for dynamoelectric machines", issued on Jan. 8, 1980; U.S. Pat. No. 4,160,180, having the title "ROTOR LAMINATION SUPPORT FOR VERTICAL HYDROGENERATOR", issued on Jul. 3, 1979; U.S. Pat. No. 4,110,652, having the title "Mounting assembly for laminated rotor rim of dynamoelectric generator rotatable about inclined shaft", issued on Aug. 29, 1978; U.S. Pat. No. 3,529,193, having the title "ROTOR FOR ELECTRIC MACHINE WITH VERTICAL SHAFT", issued on Sep. 15, 1970; U.S. Pat. No. 3,470,404, having the title "ROTORS FOR ROTATING ELECTRIC MACHINES", issued on Sep. 30, 1969; U.S. Pat. No. 3,112,420, having the title "Rotor construction for waterwheel driven electrical generator", issued on Nov. 26, 1963; U.S. Pat. No. 3,046,426, having the title "Rotor spider for electrical machines", issued on Jul. 24, 1962; U.S. Pat. No. 2,994,793, having the title "Dynamoelectric machine", issued on Aug. 1, 1962; U.S. Pat. No. 1,817,054, having title "Large, high speed rotor", issued on Aug. 4, 1931; Japanese patent document number 60-102829; and Japanese patent document number 54102501.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application; and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

What is claimed is:

1. A method for repairing a loss of support of a rim of a rotor of an electrical generator of a vertical hydrogenerator, the rotor of the electrical generator being disposed for rotation about a vertical axis when driven by a turbine of the hydrogenerator, the rotor comprising a shaft extending along the vertical axis, a plurality of spider legs attached to the shaft and extending radially away from the shaft, each of the spider legs having vertically spaced apart top and bottom sides with respect to the direction of gravity and a ledge, the rim surrounding the spider legs, the rim comprising vertically spaced apart top and bottom sides with respect to the direction of gravity, the weight of the rim normally being totally or partially supported on the ledges of the spider legs during normal operation of the hydrogenerator, the loss of support of the rim during operation of the hydrogenerator being caused by mechanical failure or loss of at least a portion of the ledges, the method comprising the steps of:

(a) fastening a plurality of thrust plates to the top side of the rim, each thrust plate of the plurality of thrust plates being placed adjacent to a respective spider leg and extending over the top side of the respective spider leg and is capable of being lifted off the respective spider leg, each thrust plate transferring at least a portion of the weight of the rim to the respective spider leg, wherein the ledges are no longer required to support the rim after performing step (a).

2. The method for repairing of claim 1, wherein the rim surrounds the spider legs while performing step (a) and wherein the rim comprises an end plate disposed on the top side of the rim, and step (a) comprises the step of:

(b) fastening the plurality of thrust plates to the end plate of the rim.

3. The method for repairing of claim 1, wherein each spider leg comprises a vertical post adjacent the rim, wherein each vertical post comprises a respective one of the ledges.

4. The method for repairing of claim 1, wherein the rim comprises rim studs or rim bolts extending upwardly from the top side of the rim, and step (a) comprises the step of:

(b) fastening each thrust plate of the plurality of thrust plates to a respective set of one or more of the rim studs or rim bolts, wherein each set of the one or more rim studs or rim bolts supports a portion of the weight of the rim.

5. The method for repairing of claim 4, comprising the steps of:

(c) disposing a sacrificial plate between each spider leg and the plate adjacent to the spider leg;
   (d) fastening each plate of the plurality of thrust plates to the respective set of one or more rim studs or rim bolts by fasteners that receive the rim studs or rim bolts and are tightened to urge the plate against the top side of the rim; and
   (e) periodically re-tightening the fasteners to compensate for wear of the sacrificial plates caused by subsequent operation of the hydrogenerator after performing step (d).

6. A method for repairing a loss of support of a rim of a rotor of an electrical generator, the rotor disposed for rotation about a vertical axis and comprising a central shaft extending along the vertical axis, a spider attached to the central shaft and having a plurality of spider arms extending radially therefrom, and a rim surrounding the plurality of spider arms and supported by a ledge extending radially outward from each of the plurality of spider arms, the method comprising:

positioning a plurality of thrust plates on a top surface of the rim, wherein each of the plurality of thrust plates extends over a top surface of one of the plurality of the spider arms; and
   fastening each of the plurality of thrust plates to the rim so that at least a portion of the weight of the rim is supported by a respective one of the spider arms and is capable of being lifted off the respective spider arm, wherein the ledges of the spider arms are no longer required to support the rim, the spider thereby relieving some or all of the weight of the rim being supported by the ledges.

7. The method of claim 6, wherein fastening each of the plurality of thrust plates to the rim comprises:
fastening each thrust plate of the plurality of thrust plates by one or more screws or bolts extending through the thrust plate and being screwed into the top side of the rim.

8. The method of claim 6, wherein the rim comprises a plurality of threaded rim studs or threaded rim bolts extending upwardly from the top surface thereof and each of the plurality of thrust plates comprises a plurality of bores sized and spaced to accept a subset of the plurality of threaded rim studs or threaded rim bolts, wherein fastening each of the plurality of thrust plates to the rim comprises:
threading a fastener over each of the threaded rim studs or threaded rim bolts positioned within respective bores in the thrust plate.

9. The method of claim 6, further comprising:
disposing a sacrificial plate between each of the plurality of thrust plates and the spider arm.

10. The method of claim 9, wherein the sacrificial plate fits within a recess in a bottom surface of the thrust plate facing the spider arm.

11. The method of claim 9, wherein the rim comprises a plurality of threaded rim studs or threaded rim bolts extending upwardly from the top surface thereof and each of the plurality of thrust plates comprises a plurality bores sized and spaced to accept a subset of the plurality of threaded rim studs or threaded rim bolts, and wherein fastening each of the plurality of thrust plates to the rim comprises threading a fastener over each of the threaded rim studs or threaded rim bolts positioned within respective bores in the thrust plate, wherein the method further comprises:
tightening the fastener on the threaded rim stud or threaded rim bolt to urge the thrust plate against the top side of the rim; and
periodically re-tightening the fastener subsequent to operation of the electric generator.

12. The method of claim 6, further comprising:
disposing a sacrificial plate between each of the plurality of thrust plates and the spider arm, wherein a top surface of the sacrificial plate contacts a bottom surface of the thrust plate facing the spider arm and a bottom surface of the sacrificial plate contacts the top surface of the spider arm or the top surfaces of the spider arm and rim.

13. The method of claim 12, wherein the rim comprises a plurality of threaded rim studs or threaded rim bolts extending upwardly from the top surface thereof and each of the plurality of thrust plates comprises a plurality bores sized and spaced to accept a subset of the plurality of threaded rim studs or threaded rim bolts, and wherein fastening each of the plurality of thrust plates to the rim comprises threading a fastener over each of the threaded rim studs or threaded rim bolts positioned within respective bores in the thrust plate, wherein the method further comprises:
tightening the fastener on the threaded rim stud or threaded rim bolt to urge the thrust plate against the top side of the rim; and
periodically re-tightening the fastener to compensate for wear of the sacrificial plate of each of the plurality of thrust plates caused by subsequent operation of the electric generator.

14. The method of claim 6, wherein the thrust plates cause the rim to be lifted off the ledges of the spider arms.

15. The method of claim 6, wherein each of the plurality of thrust plates comprises a machined steel plate having a minimum yield strength of 70 ksi and at least two bores, each bore configured to accept a threaded rim stud or threaded rim bolt for fastening the thrust plate to the rim.

* * * * *